Figures 1, 2:
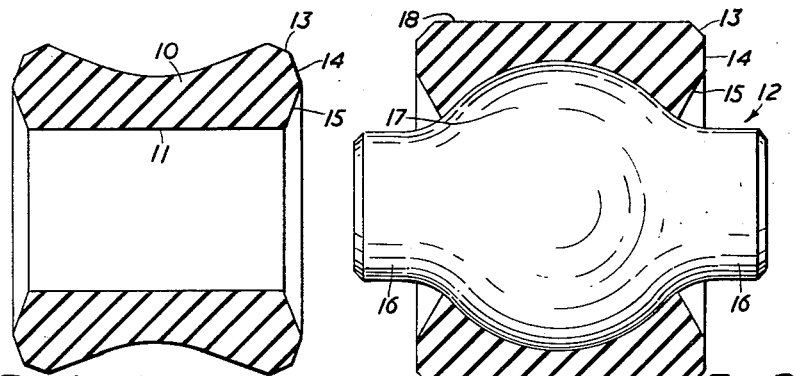

Jan. 14, 1964   P. C. HUTTON   3,117,810
RESILIENT JOINTS FOR SUSPENSION SYSTEMS
Filed July 17, 1959   2 Sheets-Sheet 1

INVENTOR
PHILLIP C. HUTTON

BY
Holcombe, Wetherill & Brisebois
ATTORNEY

United States Patent Office 3,117,810
Patented Jan. 14, 1964

3,117,810
RESILIENT JOINTS FOR SUSPENSION SYSTEMS
Philip Charles Hutton, Crawley, England, assignor to Silentbloc Limited, Crawley, England, a British company
Filed July 17, 1959, Ser. No. 827,900
Claims priority, application Great Britain July 21, 1958
4 Claims. (Cl. 287—87)

This invention relates to resilient joints. According to the present invention a resilient joint includes a rigid inner member having a surface of smooth part-spherical or barrel-shape form, a tubular bushing of rubber or like resilient material surrounding and adhering to the inner member, the radial thickness of the bushing being greater in regions adjacent its ends than in an intermediate region. Thus the radial thickness of the bushing may increase progressively from a central region towards its ends. The radial thickness of the bushing may, however, be greatest at a position spaced from its ends.

According to one arrangement the bushing has a cylindrical inner surface and an external surface which is concave, so that the inner member has to be forced into it. Alternatively the bushing may be moulded with an inner surface of appropriate smooth part-spherical or barrel-shape form and the inner member thereafter forced into it. In this case the dimensions of the bushing are preferably such that the bushing has to be stretched over the inner member. The bushing may, if required, be cemented to the inner member to provide a better adherence between the bushing and the inner member.

In an alternative arrangement the bushing of rubber or like resilient material is moulded in situ on to the inner member so that it adheres to it by bonding.

Conveniently the bushing is of cylindrical outer form when on the inner member so that it can be forced into a cylindrical outer member and adhere to it due to radial compression. The bushing may be axially compressed after insertion into a cylindrical outer member to provide or increase radial compression of the bushing.

Preferably the bushing, mounted on the inner member, is disposed in an outer member having a cylindrical inner wall to surround the bushing, end walls being provided in and retained against the outer member, the end walls bearing on the bushing. The end walls may conveniently axially compress the bushing and may be of ring form. The rings may be retained by spring clips received in annular grooves in the internal surface of the outer member, or alternatively may be retained by inwardly turning the ends of the outer member.

The end walls may in one arrangement be thicker adjacent their periphery so that they afford generally inclined internal surfaces facing the bushing. The internal surfaces of the end walls may be concave.

Figure 3:
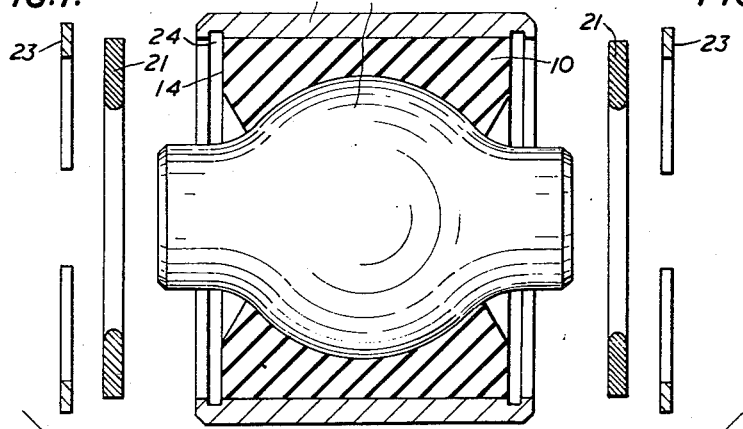
Figure 4:
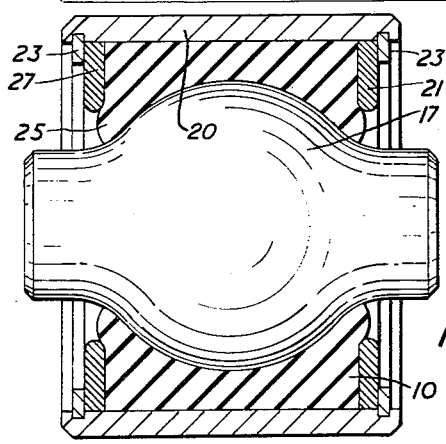
Figure 5:
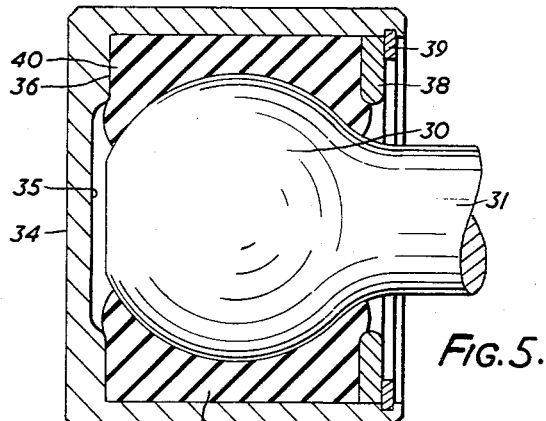
Figure 6:
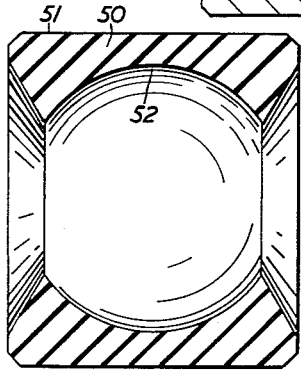
Figure 7:
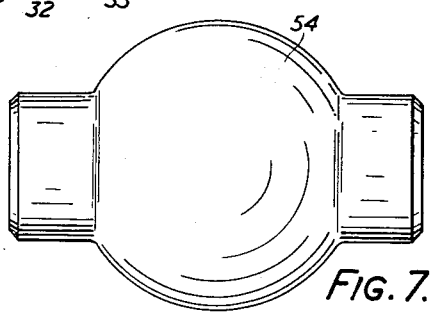
Figure 9:
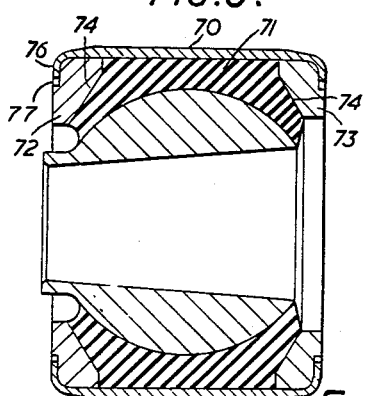
Figure 8:
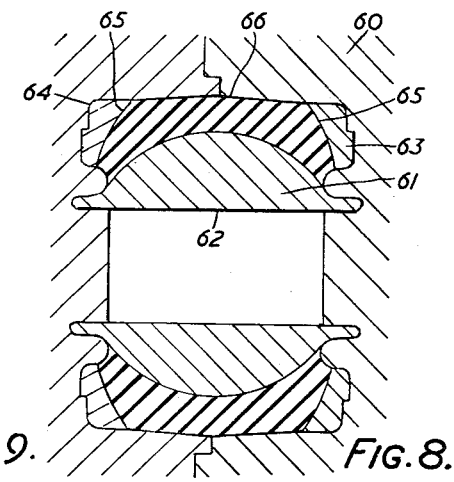

The invention may be carried into practice in a number of ways but several specific embodiments will now be described by way of example with reference to the accompanying drawings, in which:

FIGURE 1 shows a bushing of rubber or like resilient material employed in one embodiment;
FIGURE 2 shows the bushing of FIGURE 1 assembled on a bulged inner member;
FIGURE 3 shows the inner member and bushing assembled with its outer sleeve together with the end wall parts ready for assembly;
FIGURE 4 shows the completed joint using the parts of FIGURES 1 to 3;
FIGURE 5 shows an alternative embodiment;
FIGURE 6 shows an alternative form of bushing;
FIGURE 7 shows the size of the inner member suitable for the bushing of FIGURE 6;
FIGURE 8 shows a mould for producing a further embodiment;
FIGURE 9 shows yet another embodiment.

In the embodiment of FIGURES 1 to 4 the rubber bushing 10 which forms the intermediate member of the resilient joint is shown in FIGURE 1 in its unassembled condition in which it has a cylindrical bore 11 which is of a diameter such that it has to be stretched when assembled on the inner member 12 as shown in FIGURE 2. The bushing in its unassembled condition in FIGURE 1 is thicker at its ends than in its central region so that in longitudinal section the surface appears as a concave curve. In the particular embodiment shown the thickness of the wall of the bushing progressively diminishes from its ends so that half way along its length its thickness is approximately ⅝ of its thickness adjacent its ends. The very end portions of the bushing are formed with three tapered surfaces 13, 14 and 15. Extending from the bore 11 the surface 15 provides an undercut or counter-sunk end to the bushing, the surface subtending an angle of approximately 70° to its axis. Thereafter the surface at the end of the bushing is chamfered in the reverse direction in two stages, the first providing a surface 14 lying at an angle of 110° to the axis and merging into the third surface 13 lying at an angle of 160° to the axis.

As is shown in FIGURE 2 the inner member 12 has cylindrical end portions 16 and an intermediate bulge portion 17 of part-spherical form merging smoothly into the cylindrical end portions 16.

The dimensions of the bushing 10 and the inner bulged member 12 are so designed that when the bushing is stretched over the bulge as shown in FIGURE 2 its outer surface 18 is substantially cylindrical. The bushing when so stretched is distorted slightly so that the intermediate surface 14 of the three tapered end surfaces then lies normal to the axis of the bushing.

The inner member 12 with the bushing 10 assembled on it, is thereafter forced into a rigid cylindrical tubular outer member 20, shown in FIGURE 3, the bore of which is of a diameter slightly less than that of the bushing assembled on the inner bulged member in FIGURE 2. Thus, when compressed into the outer member 20 the contact pressure between the bushing 10 and the inner and outer members will be at a maximum at the points where the distance between the inner and outer members is a minimum, i.e. at the crest of the bulge 17, and will reduce gradually towards the ends of the bushing.

An end wall in the form of a ring or flat washer 21, of an external diameter equal to the diameter of the bore of the outer member 20, is then inserted into the outer member at each end and forced inwards against the end surface of the bushing 14 which is lying normal to the axis, axially to compress the bushing from each end. Spring circlips 23 are then inserted and retained in annular grooves 24 in the bore of the outer member 20 to retain the washers 21 in position and maintain the axial compression of the bushing.

This axial compression shortens the length of the bushing to such an extent that the internal undercut and external chamfered surfaces are taken up completely and in fact the ends of the bushing adjacent its bore bulge outwards slightly at 25 through the holes in the washers 21 in the manner shown in FIGURE 4 in which the completed resilient joint is shown.

In the alternative arrangement shown in FIGURE 5, the inner member is provided by a ball-shaped end 30 to a rod 31 which does not extend beyond both ends of the outer member. This outer member is in the form of a cup 32 to receive the ball and has a tubular portion 33 and a closed-end portion 34 which is of reduced thickness at 35 so as to leave an annular shoulder 36 which is equivalent to the washer 21 in the first embodiment. At its open end the cup 32 is provided with a washer 38 and a spring clip 39 to compress an inner bushing 40 as in the first embodiment.

In a further embodiment shown in FIGURES 6 and 7 a bushing 50 is moulded so that it has a cylindrical outer surface 51 and an inner contour 52 of smoothly-bulged or barrel-shape form corresponding to the form of the inner member 54 shown in FIGURE 7 and to which it is to be secured. In practice it is desirable that the dimensions of the bushing are such that it has to be slightly stretched onto the inner member, a suitable cement being employed to make it adhere firmly to it. The inner member and bushing can thereafter be assembled into an outer member in the same way as in the first embodiment.

Alternatively the construction shown in FIGURE 2 can be produced by moulding the bushing of rubber around the bulged portion of the inner member so that the bushing has an inner surface conforming to the bulge and adhering to it by bonding. The form of the mould is such that the outer surface of the bushing is cylindrical as shown in FIGURE 2 so that the inner member and bushing may be forced into a cylindrical outer member in the same way as in the embodiments already described.

FIGURE 8 shows a mould 60 within which a further embodiment is produced. This comprises an inner member 61 having a cylindrical bore 62 which is axially aligned with two end rings 63 and 64. It will be noticed that the rings 63 and 64 are thicker adjacent their peripheries so as to afford concave internal surfaces 65. The internal surface of the mould is of substantially the same diameter as the rings but its surface between them is slightly concave at 66. A bushing of rubber is produced by either injection moulding or compression moulding and during its vulcanization it bonds to the outer surface of the inner member and also to the end rings 63 and 64.

FIGURE 9 shows a further embodiment in which an assembly produced by the method shown in FIGURE 8 is inserted into an outer member 70. Thus the bushing 71 in this case is slightly compressed radially so that the bulged surface which is produced in the concave surface 66 of the mould is compressed to conform to the cylindrical inner surface of the outer member. The end rings 72 and 73 of this embodiment have inclined inner surfaces 74 bonded to the bushing and on assembly into the outer member 70 these rings are moved radially towards one another slightly to compress the bushing.

The rings are then retained by turning inwards the end portions 76 of the outer member into notches 77 in the rings.

It will be appreciated that it would be possible to mould the bushing of the embodiments in FIGURES 8 and 9 separately, and thereafter assemble the parts. In this case a cement would be used between the contacting surfaces of the bushing and inner member and the end walls.

It will be appreciated that any of the constructions described may be produced very simply and cheaply since each component is of a simple design and in particular the resilient bushing may be a simple moulding. In some embodiments the outer member may be in the form of a tube. The dimensions of the various parts can be varied to alter the degree of surface pressure so that the mechanical properties of the completed ball joint are appropriate to the desired purpose.

It is found that the type of joint described provides for considerable universal movement and will support torsional movements as well as considerable conical movements. These movements are accommodated by flexure of the bushing and accordingly no lubrication or servicing of the parts will be required. It will also be appreciated that the joints described will be capable of supporting a maximum load at right angles to the axis but at the same time can accommodate loads in all other planes.

Thus the joints described may be applicable to many purposes where a substantial degree of pivotal movement about two or more axes is required between the two parts connected by the joint. For example the joints may be used in flexible driving couplings, of the kind in which approximately coaxial driving and driven members are connected to one another by substantially tangential rigid links each of which is connected at its ends through a flexible joint respectively to the driving and driven members.

What I claim as my invention and desire to secure by Letters Patent is:

1. A resilient joint including a rigid cylindrical outer member having a cylindrical inner wall, a bulged rigid inner member spaced from the said inner wall, a tubular bushing of rubber or like resilient material mounted between and adhering to the inner and outer members, the radial thickness of the bushing being greater in regions adjacent to its ends than in the intermediate region, and end walls in the form of rings disposed transversely of and retained by the outer member, the end walls bearing against the ends of and axially compressing the bushing.

2. A resilient joint as claimed in claim 1 in which the rings are retained by springs clips received in annular grooves in the internal surface of the outer member.

3. A resilient joint as claimed in claim 1 in which the rings are retained by inwardly turning the ends of the outer member.

4. A resilient joint as claimed in claim 1 in which the end walls are thicker adjacent their periphery so their internal surfaces facing the bushing lie nearer together at their outer edges than at their inner edges.

References Cited in the file of this patent

UNITED STATES PATENTS

| | | |
|---|---|---|
| 2,350,398 | Hufferd | June 6, 1944 |
| 2,393,501 | Brown | Jan. 22, 1946 |
| 2,537,629 | Brown | Jan. 9, 1951 |
| 2,607,617 | Pringle | Aug. 19, 1952 |
| 2,774,620 | Thiry et al. | Dec. 18, 1956 |
| 2,855,232 | Kozak | Oct. 7, 1958 |
| 2,970,853 | Baker | Feb. 7, 1961 |

FOREIGN PATENTS

| | | |
|---|---|---|
| 112,223 | Australia | Dec. 23, 1940 |
| 208,094 | Australia | May 22, 1957 |
| 728,933 | France | Apr. 19, 1932 |
| 730,159 | France | May 9, 1932 |